(12) United States Patent
Schlachter et al.

(10) Patent No.: US 12,013,260 B2
(45) Date of Patent: Jun. 18, 2024

(54) ADD-ON MODULE FOR A FIELD DEVICE

(71) Applicant: Endress+Hauser SE+Co. KG, Maulburg (DE)

(72) Inventors: Marc Andreas Schlachter, Wehr (DE); Wolfgang Trunzer, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 59 days.

(21) Appl. No.: 17/600,192

(22) PCT Filed: Mar. 12, 2020

(86) PCT No.: PCT/EP2020/056709
§ 371 (c)(1),
(2) Date: Sep. 30, 2021

(87) PCT Pub. No.: WO2020/200689
PCT Pub. Date: Oct. 8, 2020

(65) Prior Publication Data
US 2022/0155099 A1 May 19, 2022

(30) Foreign Application Priority Data

Apr. 2, 2019 (DE) ...................... 10 2019 108 564.0

(51) Int. Cl.
G01D 21/02 (2006.01)
G01D 3/08 (2006.01)
(Continued)

(52) U.S. Cl.
CPC ............... *G01D 3/08* (2013.01); *G01D 11/24* (2013.01); *G01D 11/30* (2013.01); *G01D 21/02* (2013.01)

(58) Field of Classification Search
CPC .......... G01D 3/08; G01D 11/24; G01D 11/30; G01D 21/02
See application file for complete search history.

(56) References Cited

U.S. PATENT DOCUMENTS

2010/0281987 A1* 11/2010 Buschnakowski ....... G01H 3/00
73/658
2011/0264396 A1 10/2011 Kitchener et al.

FOREIGN PATENT DOCUMENTS

CN 103062484 A 4/2013
CN 103221149 A 7/2013
(Continued)

*Primary Examiner* — Jamel E Williams
(74) *Attorney, Agent, or Firm* — Kelly J. Smith; Endress+Hauser (USA) Holding, Inc.

(57) ABSTRACT

An add-on module for a field device for measuring and/or monitoring at least one measurement variable, wherein a portion of the field device adjacent the process is exposed to process conditions at the site of use and a portion of the field device opposite the process is exposed to ambient conditions at the site of use includes: at least one receiving device into which one measuring module can be inserted, wherein each measuring module acquires by measurement at least one ambient parameter and/or at least one effect of the ambient conditions on the measuring module; and an evaluation unit connected to the measuring module and configured to, based on the ambient parameter and/or effects acquired by the measuring module, determine an instantaneous stress acting on the field device and/or a total stress to which the field device has been exposed thus far during the period of use thereof.

12 Claims, 2 Drawing Sheets

(51) Int. Cl.
*G01D 11/24* (2006.01)
*G01D 11/30* (2006.01)

(56) References Cited

FOREIGN PATENT DOCUMENTS

| | | | | |
|---|---|---|---|---|
| CN | 104094290 | A | | 10/2014 |
| CN | 104280518 | A * | | 1/2015 ............ G01N 33/00 |
| CN | 204649262 | U | | 9/2015 |
| CN | 204916645 | U | | 12/2015 |
| CN | 108200773 | A | | 6/2018 |
| DE | 102004063469 | A1 | | 7/2006 |
| DE | 102007062919 | A1 | | 6/2009 |
| DE | 102008043297 | A1 | | 5/2010 |
| DE | 112008003195 | T5 | | 7/2011 |
| DE | 112008003195 | T5 * | | 7/2011 ............ G05B 19/058 |
| DE | 102014101945 | A1 * | | 6/2015 ............ G01D 18/00 |
| DE | 102015206698 | A1 * | | 4/2016 ............ G08C 19/00 |
| DE | 102014118394 | A1 | | 6/2016 |
| DE | 102016200693 | A1 * | | 7/2016 |
| DE | 102016200693 | A1 | | 7/2016 |
| DE | 102016101237 | A1 | | 7/2017 |
| DE | 102016207059 | A1 | | 10/2017 |
| DE | 102016107970 | A1 * | | 11/2017 ............ G01F 23/263 |
| DE | 102016124796 | A1 * | | 6/2018 |
| DE | 102019219618 | A1 * | | 6/2021 |
| JP | 03229124 | A | | 10/1991 |
| JP | 792901 | A | | 4/1995 |
| JP | 2000245990 | A | | 9/2000 |
| JP | 2002277319 | A | | 9/2002 |
| JP | 2003508742 | A | | 3/2003 |
| JP | 2004310439 | A | | 11/2004 |
| JP | 2006146347 | A | | 6/2006 |
| JP | 2007512625 | A | | 5/2007 |
| JP | 2016512355 | A | | 4/2016 |
| JP | 2017075844 | A | | 4/2017 |
| JP | 2018155714 | A | | 10/2018 |
| JP | 2018533004 | A | | 11/2018 |
| RU | 72763 | U1 | | 4/2008 |
| RU | 166512 | U1 | | 11/2016 |
| WO | WO-2018077628 | A1 * | | 5/2018 ............ G06F 3/0625 |

* cited by examiner

ADD-ON MODULE FOR A FIELD DEVICE

CROSS-REFERENCE TO RELATED APPLICATIONS

The present application is related to and claims the priority benefit of German Patent Application No. 10 2019 108 564.0, filed on Apr. 2, 2019 and International Patent Application No. PCT/EP2020/056709, filed on Mar. 12, 2020, the entire contents of which are incorporated herein by reference.

TECHNICAL FIELD

The invention relates to an add-on module for a field device for measuring and/or monitoring at least one measurement variable, wherein the field device comprises a measuring device for capturing by measurement the measurement variable and a process connection, wherein the process connection is designed to fasten the field device to a location of use in such a way that a portion of the field device facing the process at the location of use comprising at least a part of the measuring device is exposed to ambient conditions prevailing at the location of use, and a portion of the field device facing away from the process is exposed to ambient conditions prevailing at the location of use.

BACKGROUND

Field devices of the aforementioned type are used in a variety of different fields of application for measuring and/or monitoring measurement variables of different types. Examples of such field devices are pressure measuring devices, fill-level measuring devices, temperature measuring devices, flow measuring devices, etc., as they are marketed, for example, by the Endress+Hauser group.

These field devices usually comprise a process connection by means of which they can be mounted at the respective location of use in such a way that their measuring device is exposed to the measurement variable to be measured and/or monitored on the process side. In addition, they regularly comprise electronics connected to the measuring device, which electronics are arranged in the portion of the field device facing away from the process in order to protect against the process conditions present on the process side. These electronics regularly serve to determine measurement and/or monitoring results on the basis of a magnitude of the measurement variable that can be captured by measurement by means of the measuring device and that depends on the measurement variable, and to provide an output and/or a display via an interface connected to the electronics.

Measurement and/or monitoring results determined with field devices are, inter alia, to monitor, control and/or regulate processes used in measurement and control technology, as well as in process automation, such as industrial production and/or processing processes. Accordingly, malfunctions, failures, as well as, of course, faulty measurement and/or monitoring results of field devices can have serious consequences for humans and the environment, for the process running at the locations of use and/or the products produced by these processes.

It is known that the measuring devices can be exposed to very adverse process conditions from the field devices on the process side under certain circumstances, such as high temperatures and/or pressures, which stress the measuring device in such a way that they have a detrimental effect on the operability of the field device over time. In order to ensure reliable, error-free operation, these measuring devices must be replaced before functional impairments caused by the process conditions exceed a tolerable extent. In this connection, DE 10 2004 063 469 A1 describes a method according to which process parameters stressing the measuring device are measured by means of the measuring device of the field device that is exposed to the process conditions and an instantaneous stress of the measuring device is determined therefrom. In addition, a total stress to which the measuring device has previously been exposed to overall during the service life is determined on the basis of the stresses continuously determined during the service life. If the total stress exceeds a predetermined limit value, the measuring device is replaced. If it is below the limit value, a remaining service life is predicted on the basis of the total stress and the measuring device is replaced before the remaining service life elapses.

Field devices are, however, not only exposed to very adverse process conditions under certain circumstances, but must also withstand the ambient conditions prevailing at the site of use. If, for example, a field device is exposed to strong solar radiation at a location of use, there is the risk that seals contained in the field device age faster. If a field device is exposed to a salt-containing ambient atmosphere at the location of use, there is an increased risk of corrosion there. In addition to the ambient parameters mentioned above only as an example, depending on the location of use, there are, of course, a multiplicity of further ambient parameters that, individually or in combination with one another, can lead to appreciable impairments of the operability of field devices under certain circumstances.

In contrast to process parameters stressing the measuring devices of field devices, which process parameters result from the measurement variable to be measured and/or monitored by the field device and are thus known and identical for field devices of a certain type, in the production of field devices, the environment in which they are later used is generally not predictable. Accordingly, in the production of field devices, which ambient parameters at the later location of use can lead to a significant stress on the field device are not known.

This is usually taken into account today in that field devices are recalibrated, serviced and/or replaced before a maximum period of use specified for the respective device by the manufacturer. In this case, a correspondingly shortened service life can be set for locations of use of certain categories, such as locations of use in offshore systems in which particularly rough ambient conditions are usually expected. For safety reasons, this period must be short enough that it also meets the worst ambient conditions possibly occurring at locations of use of the respective category. This results in those field devices that are subject to only significantly lower stresses at locations of use of the respective category due to ambient conditions being recalibrated, serviced and/or replaced after the shortened service life has elapsed. This results in an unnecessary increase in operating costs.

Conversely, a field device can be exposed to ambient parameters at a location of use that at least temporarily exceed an upper limit presumed during the assessment of the maximum service life. There is thus the risk that the operability of this field device will already be impaired due to the ambient conditions before the maximum service life expires. For example, due to its particular position, a field device used in wastewater treatment can be exposed to an increased concentration of an aggressive medium contained in the ambient atmosphere, such as an increased chlorine content, which significantly exceeds a concentration usually occurring in this industry.

SUMMARY

It is an object of the invention to specify a device for capturing stresses exerted on a field device by ambient conditions, which makes it possible to consider the stress-relevant influencing variables present there in a manner flexibly adaptable to the conditions of the location of use.

For this purpose, the invention comprises an add-on module for a field device for measuring and/or monitoring at least one measurement variable, wherein the field device comprises a measuring device for capturing by measurement of the measurement variable and a process connection, wherein the process connection is designed to fasten the field device to a location of use in such a way that a portion of the field device facing the process at the location of use comprising at least a part of the measuring device is exposed to ambient conditions prevailing at the location of use, and a portion of the field device facing away from the process is exposed to ambient conditions prevailing at the location of use, wherein the add-on module comprises fastening means by means of which the add-on module can be mounted on the portion of the field device facing away from the process, wherein the add-on module comprises at least one receiving device into which a measurement module that can be selected from a module toolbox comprising different measurement modules can be or is inserted, wherein each measurement module is designed to capture by measurement at least one ambient parameter and/or at least one effect of the ambient conditions on the respective measurement module, and wherein the add-on module comprises an evaluation unit designed to determine an instantaneous stress or a total stress acting on the field device equipped with the add-on module on the basis of the ambient parameters and/or effects captured by means of the selected measurement modules inserted into the receiving devices and connected to the evaluation unit, to which stress the field device equipped with the add-on module has previously been exposed to over its entire service life.

Add-on modules according to the invention offer the advantage that they can be flexibly adapted to the conditions present at the location of use of the field device via the targeted selection of the measurement modules. It is thus possible in a cost-effective manner to capture by measurement, at each location of use, those ambient parameters and/or effects that occur at the respective location of use to an extent that can lead to a significant stress on the field device. It is particularly advantageous in this respect that, for this purpose, it is neither necessary to know the location-specific ambient parameters and/or effects already in the production of the field device, nor to equip each field device at the factory in each case with a plurality of devices for capturing a wide variety of variables, which do not occur at all to a stress-relevant extent at the later location of use of the field device.

A first embodiment comprises an add-on module with which the modular system and/or the add-on module comprises:
  a measurement module designed as a temperature measurement module for capturing by measurement an ambient temperature,
  a measurement module designed as a humidity measurement module for capturing by measurement an ambient humidity, a relative humidity or an absolute humidity,
  a measurement module designed as a vibration measurement module for capturing by measurement vibrations of the add-on module,
  a measurement module designed as a concentration measurement module for capturing by measurement a concentration of a substance, an aggressive and/or corrosive medium, a salt content and/or a chlorine content contained in the environment,
  a measurement module designed as a radiation measurement module for capturing by measurement a radiation acting on the radiation measurement module, a solar radiation acting on the radiation measurement module or a radioactive radiation acting on the radiation measurement module,
  a measurement module designed as a moisture measurement module for capturing by measurement a humidity penetrating into a housing surrounding the moisture measurement module,
  a corrosion measurement module comprising a sacrificial element, which is exposed to the ambient conditions and has at least one measurable property, which changes due to corrosion of the sacrificial element, and/or
  a dummy module that can be inserted into the receiving devices and that closes the respective receiving device in the inserted state.

First embodiments comprise an add-on module with which the evaluation unit is designed in such a way that it:
  by means of the instantaneous values of the ambient parameters and/or the effects captured by the measurement module attached thereto on the basis of characteristic data or characteristic curves stored in a memory, assigns a respective ambient stress value and determines the instantaneous stress as a function, as a sum or as a weighted sum of the ambient stress values,
  determines the total stress as an integral of the continuously determined stresses over the previous service life,
  outputs an alarm as soon as the current stress and/or the previous total stress exceeds a limit value specified for this purpose, and/or
  determines a remaining service life on the basis of the total stress.

A second embodiment comprises an add-on module that comprises an output connected to the evaluation unit, via which the evaluation unit displays and/or provides in readable form the current stress, the total stress, the remaining service life and/or the alarm.

According to a second embodiment, the add-on module is designed as a housing cover mountable on a portion of the field device facing away from the process.

A third embodiment comprises an add-on module, with which:
  the receiving devices are designed as slots into which the measurement modules are each insertable or inserted in such a way that at least one outside of the respective measurement module is exposed to the ambient conditions, and/or
  the measurement modules and the receiving devices have connecting elements that are complementary to one another and by means of which the measurement modules can be or are fastened in the receiving device and/or by means of which the measurement modules can be or are electrically connected to the evaluation unit.

A fourth embodiment comprises an add-on module in which at least one or each measuring module of the modular toolbox and/or of the add-on device each has a module identifier that can be read out by means of the evaluation unit connected thereto.

A fifth embodiment comprises an add-on module that comprises electrical connecting means via which the add-on module can be or is electrically connected to an electronic component of the field device arranged in the portion of the field device facing away from the process.

According to a embodiment of the fifth embodiment, the add-on module is designed in such a way that it can be supplied with power by the field device via the electrical connecting means.

According to a embodiment of the fifth embodiment or its embodiment, the evaluation unit is designed to determine the instantaneous stress and/or the total stress by taking additional consideration of at least one process variable that can be or is captured by the field device, which can be or is transmitted via the connecting means to the evaluation unit, and the process variables comprise the measurement variable and/or at least one auxiliary variable that can be or is captured by measurement by means of the measuring device or by means of a sensor arranged in the field device facing the process.

According to an embodiment of the add-on module according to the first embodiments and the latter embodiment, the evaluation unit is designed in such a way that in each case it assigns a process stress value to the instantaneous value of each process variable on the basis of characteristic data or characteristic curves stored in the memory and determines the current stress as a function, as a sum or as a weighted sum of the process stress values and the ambient stress values.

The invention furthermore comprises a field device with an add-on module according to the invention, which comprises the measuring device for capturing by measurement the measurement variable, the region facing at least one part of the measuring device, the region facing away from the process and the process connection, wherein the process connection is designed to fasten the field device at a location of use in such a way that the region facing the process is exposed to process conditions prevailing at the location of use and the region facing away from the process is exposed to ambient conditions prevailing at the location of use, and wherein the add-on module is mounted on the portion of the field device facing away from the process by means of the fastening means.

An embodiment of the field device with an add-on module according to the fifth embodiment or its embodiment is characterized in that:

the field device comprises electronics connected to the measuring device, said electronics being arranged in the portion of the field device facing away from the process, and the field device is designed to capture by measurement at least one process variable and to provide it via an interface connected to the electronics or an interface provided for connecting an operating unit and/or a display and connected to the electronics, wherein the process variables comprise the measurement variable and/or at least one auxiliary variable that can be by measurement by means of the measuring device or by means of a sensor arranged in the portion of the field device facing the process, and wherein the add-on device is connected to the electronics via the interface.

The invention furthermore comprises a field device according to the invention, which comprises an electronics arranged in the region facing away from the process, and in which the add-on device is connected to the electronics and is supplied with energy via the electronics.

The invention further comprises a field device according to the invention, in which the portion of the field device facing away from the process comprises a housing, and the add-on device forms a housing cover mounted on the housing.

BRIEF DESCRIPTION OF THE DRAWINGS

The invention and its advantages will now be explained in detail using the figures in the drawing, which show three embodiments. The same elements are indicated by the same reference numbers in the figures.

DETAILED DESCRIPTION

Figure 1:
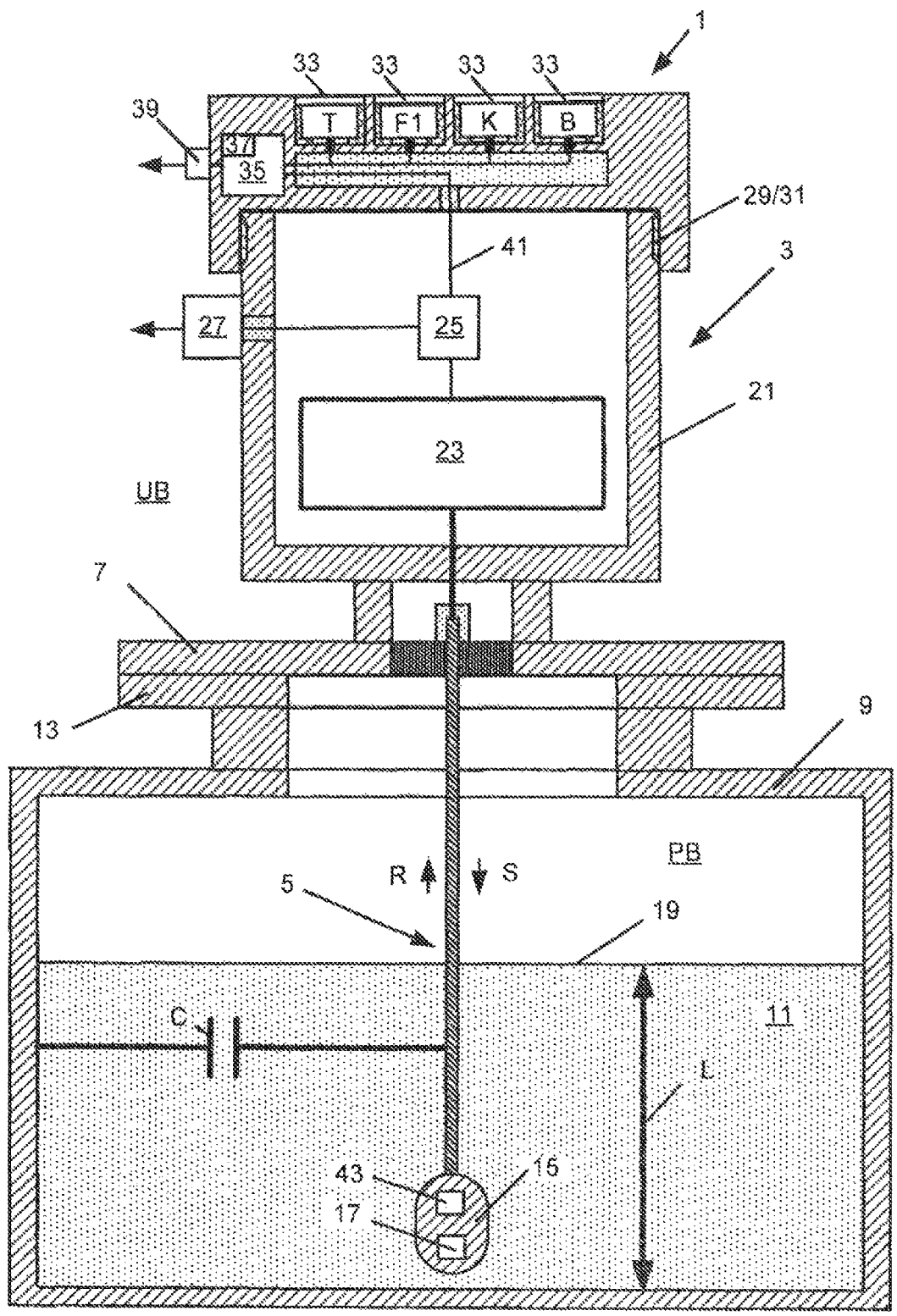
FIG. 1 shows a field device mounted at a location of use with an add-on module.

The invention comprises an add-on module 1 for a field device 3 for measuring and/or monitoring at least one measurement variable L, and a field device 3 equipped with such an add-on module 1. An example of a field device 3 equipped with an add-on module 1 according to the invention is shown in FIG. 1.

Add-on modules 1 according to the invention can be used in conjunction with field devices 3, which comprise a measuring device 5 for capturing by measurement the measurement variable L and a process connection 7. In this case, the process connection 7 is designed to fasten the field device 3 to a location of use in such a way that a portion of the field device 3 facing the process comprising at least one part of the measuring device 5 is exposed to process conditions PB prevailing at the location of use, and a portion of the field device 3 facing away from the process is exposed to ambient conditions UB prevailing at the location of use.

FIG. 1 shows as an example a field device 3 designed as a fill-level measuring device for measuring and/or monitoring a fill level L of a filling material 11 located in a container 9, the process connection 7 of which is designed here as a flange being mounted on a process connection 13, which is provided at the location of use and is complementary for this purpose, such as the counter-flange shown here. Alternatively, other process connection variants known from the prior art can of course be used.

The measuring device 5 shown here as an example comprises a rod-shaped or cable-shaped probe extending into the container 9, which here is exposed to the process conditions PB prevailing in the container 9, by means of which probe a variable dependent on the fill level L can be captured by measurement. A suitable fill-level dependent variable is, for example, a hydrostatic pressure dependent on the fill level L, or a capacitance dependent on the fill level L of a capacitor C formed by the probe serving as an electrode in this case and a container wall of the container 9 surrounding the probe, which hydrostatic pressure can be captured by measurement by means of a pressure sensor 17 arranged on the end region 15 of the probe located in the container 9. Alternatively or additionally, the fill-level measuring device can be designed to transmit electromagnetic signals S along the probe serving in that case as waveguide into the container 9 and to receive its echo signals R reflected back at a filling material surface 19 after a running time dependent on the fill level L. In this case, the running time that can be captured by measurement forms the variable that depends on the fill level L on the basis of which the field device 3 measures and/or monitors the fill level L.

As is customary in field devices known from the prior art, the regions of field devices 3 facing away from the process of field devices 3, which can be or are equipped with an add-on module 1 according to the invention, can each comprise, optionally, a housing 21 shown in FIG. 1 as an option, in which electronics 23 also shown as an option in FIG. 1 is arranged. These electronics 23 are preferably designed such that they:

a) supply energy to the measuring device 5 connected thereto, b) detect, by means of the variable captured by measurement by means of the measuring device 5 connected thereto, a measurement and/or monitoring result corresponding to the measurement variable L on the, and/or c) provide a measurement and/or monitoring result determined by the field device 3 via an interface 25 connected to the electronics 23.

Optionally, the field device 3 can comprise an output 27 connected to the interface 25, such as a relay output, a current output, a signal output and/or a data bus line for connecting the field device 3 to a data bus line, for example, a field bus, suitable output, via which measurement and/or monitoring results determined by the field device 3 can be output and/or queried. Alternatively or additionally thereto, electronics 23 and interface 25 can optionally be designed to transmit measurement and/or monitoring results to a unit, such as an operating interface and/or a display, which is not shown here and can be connected to the interface 25, and/or to supply the unit with energy. Even if a plurality of field devices known from the prior art have the aforementioned outputs, electronics, and/or interfaces, it is pointed out here preemptively that add-on modules 1 according to the invention can also be used in conjunction with field devices 3 without corresponding electronics, interfaces and/or outputs.

The add-on module 1 comprises fastening means 29 by means of which the add-on module 1 can be or is mounted on the portion of the field device 3 facing away from the process. Fastening means known from the prior art, such as a tensioning belt, a clamping device, a plug-and-socket device, a flange and/or a thread, are suitable as fastening means 29. In this case, it depends on the selection of the fastening means 29 whether or not a fastening means 31 complementary to this is required on the field device side in the portion of the field device 3 facing away from the process. FIG. 1 shows an example with which the fastening means 29 of the add-on module 1 and the complementary fastening means 31 arranged on the portion of the field device 3 facing away from the process are designed as threads that can be screwed together.

Furthermore, the add-on module 1 comprises at least one receiving device, preferably a plurality of receiving devices not shown in detail in the figures, into each of which a measurement module 33 that can be selected from a module toolbox comprising different measurement modules 33 can be inserted. In this case, each measurement module 33 of the module toolbox is respectively designed to capture by measurement at least one ambient parameter and/or at least one effect of the ambient conditions on the respective measurement module 33.

In particular, the measurement modules 33 listed below as examples are suitable for this purpose. In this way, the modular toolbox and/or the add-on module 1 can, for example, comprise a measurement module 33 designed as a temperature measurement module T for capturing by measurement an ambient temperature, a measurement module 33 designed as a humidity measurement module F1 for capturing by measurement an ambient humidity, a relative humidity or an absolute humidity, a measurement module 33 designed as a vibration measurement module V for capturing by measurement vibrations of the add-on module 1, a measurement module 33 designed as a concentration measurement module K for capturing by measurement a concentration of a substance, an aggressive and/or corrosive medium, a salt content and/or a chlorine content contained in the environment, and/or a measurement module 33 designed as a radiation measurement module γ for capturing by measurement a radiation acting on the radiation measurement module γ, a solar radiation acting on the radiation measurement module γ or a radioactive radiation acting on the radiation measurement module γ.

Sensors known from the prior art for capturing by measurement the respective variable can be used in these measurement modules 33, for example.

Alternatively or additionally thereto, the modular toolbox and/or the add-on module 1 can of course comprise at least one further measurement module 33 for capturing by measurement at least one further ambient parameter and/or at least one further effect of the ambient conditions. An example of this is a measurement module 33 designed as a humidity measurement module F2 for capturing by measuring a humidity penetrating into a housing surrounding the humidity measurement module F2. A further example is a corrosion measurement module R that comprises a sacrificial element, which is exposed to the ambient conditions and has a property that can be measured by means of the corrosion measurement module R and changes by corrosion of the sacrificial element. A sacrificial anode connected to a measuring circuit, the electrical resistance of which can be captured by measured by means of the measuring circuit as a result of corrosion, is suitable as a sacrificial element, for example.

Optionally, in addition to the measurement modules 33, the modular toolbox and/or the add-on module 1 can also comprise at least one dummy module B. These dummy modules B can each be inserted into the receiving devices in such a way that they close the respective receiving devices. Dummy modules B offer the advantage that excess receiving devices of the add-on module 1 that are not required to receive one of the measuring modules 33 can be closed by them.

Figure 2:
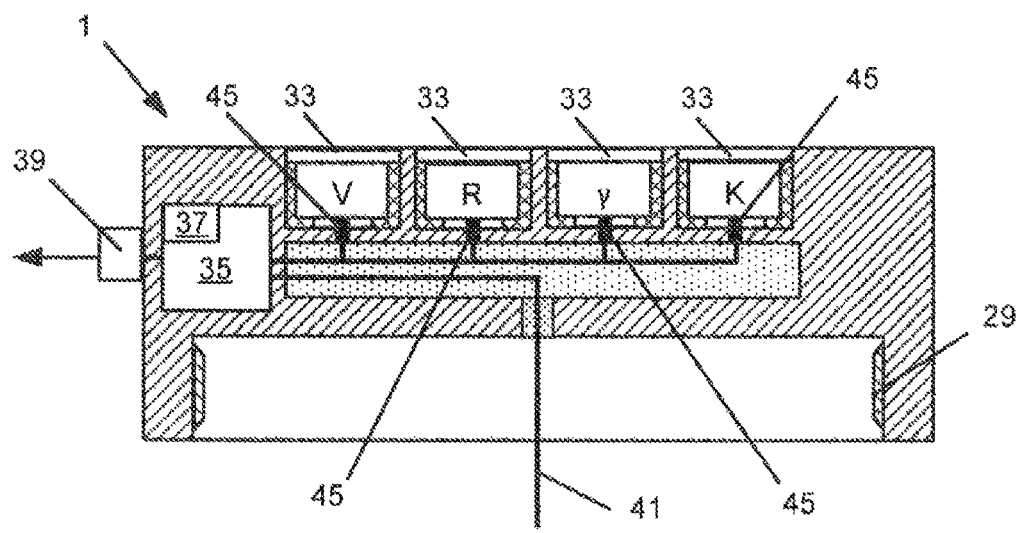
FIG. 2 shows the add-on module of FIG. 1.

The measurement modules 33 respectively suitable for the capturing by measurement of the ambient parameters and/or effects relevant to the stress on the location of use of the respective add-on module 1 are selected from the modular toolbox and inserted into the add-on module 1. If only a number of measurement modules 33 that is less than the number of receiving devices of the add-on module 1 is required for this purpose, preferably one of the dummy modules B is inserted into the remaining receiving devices in each case. The add-on module 1 for a field device 3 used in a swimming pool can thus be equipped with a temperature measurement module T, a humidity measurement module F1 for measuring the atmospheric humidity, a concentration measurement module K for measuring the chlorine content contained in the environment and a dummy module B. This example is shown in FIG. 1. Analogously, the add-on module 1 for a field device 3 used on a drilling rig can be equipped with a vibration measurement module V, a corrosion measurement module R, a radiation measurement module γ for capturing by measurement the solar radiation and a concentration measurement module K for capturing by measurement the salt content contained in the surroundings. This sample is shown in FIG. 2.

Add-on modules 1 according to the invention each comprise an evaluation unit 35 that is designed to determine an instantaneous stress or a total stress acting on the field device 3 equipped with the add-on module 1 on the basis of the ambient parameters and/or effects captured by means of the selected measurement modules 33 inserted into the receiving device and connected to the evaluation unit 35, to which the field device 3 equipped with the add-on module 1 has previously been exposed to over its entire service life.

The invention has the aforementioned advantages. Some optional preferred embodiments of individual features of the invention that can be used individually and/or in combination with one another are described in detail below.

The evaluation unit 35 can optionally be designed in such a way that it assigns a respective ambient stress value to the instantaneous values of the ambient parameters captured by means of the measurement modules 33 connected thereto and/or the effects on the basis of characteristic data or characteristic curves stored in a memory 37 and determines the instantaneous stress as a function, as a sum or as a weighted sum of the ambient stress values. Alternatively or additionally thereto, the evaluation unit 35 is optionally preferably designed in such a way that it determines the total stress as an integral of the continuously determined instantaneous stresses over the service life.

Alternatively or additionally thereto, the evaluation unit 35 is preferably designed such that it outputs an alarm as soon as the instantaneous stress and/or the previous total stress exceeds a limit value specified for this purpose.

Alternatively or additionally thereto, the evaluation unit 35 is preferably designed in such a way that it determines a remaining service life on the basis of the total stress. This offers the advantage that a maintenance and/or calibration of the field device 3 to be carried out before the remaining service life expires or a replacement of the field device 3 or of the measuring device 5 of the field device 3 to be carried out before the remaining service life elapses can be scheduled accordingly.

Optionally, the add-on module 1 comprises an output 39 that is connected to the evaluation unit 35 and via which the evaluation unit 35 outputs, displays and/or provides in readable form the instantaneous stress, the total stress and/or the remaining service life, and optionally also issues an alarm.

Alternatively or additionally thereto, the add-on module 1 preferably comprises electrical connecting means 41 via which the add-on module 1 can be or is electrically connected to the electronics 23 of the field device 3 arranged in the portion of the field device 3 facing away from the process.

In this case, the add-on module 1 is optionally preferably designed in such a way that it can be supplied with power by the field device 3 via the electrical connection means 41. Alternatively, the auxiliary device 1 can comprise its own power supply or be supplied via a separate power supply unit.

Alternatively or additionally thereto, the evaluation unit 35 is preferably designed in such a way that it determines the instantaneous stress and/or the total stress, taking additional consideration of at least one process variable PG that can be or is transmitted via the connection means 41 to the evaluation unit 35 and that is captured by measurement by the field device 3. This offers the advantage that process conditions that act on the field device 3 on the process side and that can lead to functional impairments of the field device 3 can also be taken into account in this respect. The process variables PG preferably comprise the measurement variable L and/or at least one auxiliary variable H, which can be or is each captured by measurement by means of the measuring device 5 or by means of a sensor 43 arranged in the field device 3 facing the process. Process parameters of the process conditions PB acting on the portion of the field device 3 facing the process, such as, for example, a process temperature measured by means of a temperature sensor and/or a process pressure measured by means of a pressure sensor, are suitable as auxiliary variable H, for example.

With this embodiment variant, the evaluation unit 35 can optionally be designed, for example, such that it assigns a process stress value to each process variable PG in each case on the basis of characteristic data or characteristic curves stored in the memory 37, and determines the instantaneous stress as a function, as a sum or as a weighted sum of the ambient stress values and the process stress values.

Irrespective of the aforementioned embodiments, the electrical connection of the connecting means 41 of the add-on module 1 to the electronics 23 of the field device 3 preferably takes place via an interface 25, which is present anyway in the field device 3 and which is suitable for energy transmission and/or for transmitting the process variables PG. In particular, the aforementioned field devices provided in field devices known from the prior art are suitable for connecting a unit, such as a control interface and/or a display.

An embodiment that is currently considered particularly advantageous with regard to a possible way desired electrical connection of the add-on module 1 to the electronics 23 of the field device 3 and/or with regard to the simplest possible installability of the add-on module 1 on the portion of the field device 3 facing away from the process consists of designing the add-on module 1 as a housing cover mountable on the housing 21 of the field device 3 comprising the electronics 23. This embodiment is shown in FIGS. 1 and 2 and offers the advantage that already existing field devices 3 or even field devices already in use comprising a conventional housing cover can be equipped with the add-on module 1 at all times as needed in that the add-on module 1 is mounted on the housing 21 instead of the conventional housing cover. Field devices 3 whose conventional housing cover comprises one of the units described above offer the advantage that the add-on module 1 coming into place of the conventional housing cover can be or is connected to the electronics 23 via the interface 25 intended for connecting the unit anyway.

Irrespective of the above-described embodiments of the add-on module 1, the receiving devices of the add-on module 1 are preferably designed as slots, into which the measurement modules 33 can be inserted in such a way that each measurement module 33 used in one of the receiving devices respectively has at least one exterior exposed to the ambient conditions. FIGS. 1 and 2 show an embodiment with which the measurement modules 33 and the receiving devices are each complementary to one another, such as the connecting elements 45 shown in FIG. 2, by means of which the measurement modules 33 can be fastened or fastened in the receiving devices and/or can be or are electrically connected to the evaluation unit 35.

Optionally, the measuring modules 33 of the modular toolbox or the measuring modules 33 inserted into the add-on device 1 can each have a module identifier that can be read out by means of the evaluation unit 35 connected thereto. This offers the advantage that the evaluation unit 35 automatically detects the measurement modules 33 connected thereto and can thus accommodate their operation immediately after they have been equipped with the measurement module(s) 33.

The invention claimed is:

1. A system comprising a field device for measuring and/or monitoring at least one measurement variable of a process, includes:
   an add-on module for the field device, and a modular toolbox,
   wherein the field device comprises a process connection and a measuring device for acquiring by measurement the at least one measurement variable, wherein the process connection is configured to enable the field device to be fastened to a location of use such that a portion of the field device adjacent the process, which includes at least a part of the measuring device, is exposed to process conditions of the process prevailing at the location of use, and a portion of the field device opposite the process is exposed to ambient conditions prevailing at the location of use,
   wherein the modular toolbox comprises a plurality of different measurement modules, and wherein the add-on module comprises:
   a fastening connection configured to enable the add-on module to be mounted and fastened on the portion of the field device opposite the process;
   at least one receiving device configured to enable a measurement module to be inserted therein, wherein the measurement module is selected from the modular toolbox including the plurality of different measurement modules, wherein each receiving device is configured as a slot into which the measurement module is inserted such that an exterior of the respective measurement module is exposed to the ambient conditions; and wherein each measurement module is configured to acquire by measurement at least one ambient parameter and/or at least one effect of the ambient conditions on the respective measurement module; and
   an evaluation unit configured to determine, based on the ambient parameters and/or effects acquired by means of selected measurement modules inserted into corresponding receiving devices of the at least one receiving device and connected to the evaluation unit, an instantaneous stress acting on the field device to which the add-on module is mounted and fastened and/or a total stress to which the field device has been exposed to during a preceding service period of the field device.

2. The system of claim 1, wherein the modular toolbox and/or the add-on module include at least one of the following:
   a measurement module configured as a temperature measurement module configured to acquire an ambient temperature by measurement;
   a measurement module configured as a humidity measurement module configured to acquire an ambient humidity, a relative humidity or an absolute humidity by measurement;
   a measurement module configured as a vibration measurement module configured to acquire vibrations of the add-on module by measurement;
   a measurement module configured as a concentration measurement module configured to acquire a concentration of a substance, an aggressive and/or corrosive medium, a salt content and/or a chlorine content present in the ambient conditions by measurement;
   a measurement module configured as a radiation measurement module configured to acquire a radiation acting on the radiation measurement module, a solar radiation acting on the radiation measurement module or a radioactive radiation acting on the radiation measurement module by measurement;
   a measurement module configured as a moisture measurement module configured to acquire a humidity penetrating into a housing surrounding the moisture measurement module by measurement;
   a corrosion measurement module including a sacrificial element that is exposed to the ambient conditions, the sacrificial element having at least one measurable property that changes due to corrosion of the sacrificial element; and/or
   a dummy module configured to be inserted into the at least one receiving device as to close the at least one receiving device when inserted.

3. The system of claim 1, wherein the evaluation unit includes a memory and is configured to:
   assign a respective ambient stress value and determine the instantaneous stress as a function, as a sum or as a weighted sum of the ambient stress values using instantaneous values of the ambient parameters and/or the effects acquired by the respective measurement module attached thereto based on characteristic data or characteristic curves stored in the memory;
   determine the total stress as an integral of continuously determined stresses over the preceding service period;
   output an alarm when a current stress and/or the total stress exceeds a limit value; and/or
   determine a remaining service life of the field device based on the total stress.

4. The system of claim 1, further comprising an output connected to the evaluation unit, via which output the evaluation unit displays and/or provides the instantaneous stress, the total stress, a remaining service life and/or an alarm in readable form.

5. The system of claim 1, wherein the add-on module is configured as a housing cover to be mounted on a housing of the field device opposite the process.

6. The system of claim 1, wherein:
   each measurement modules and the corresponding receiving device include complementary connecting elements that enable each measurement module to be fastened in the corresponding receiving device and/or to be electrically connected to the evaluation unit.

7. The system of claim 1, wherein at least one or each measuring module of the modular toolbox and/or of the add-on module respectively includes a module identifier that can be read out by the evaluation unit connected thereto.

8. The system of claim 1, wherein:
   the field device comprises electronics disposed in the portion of the field device opposite the process and connected to the measuring device; and
   the add-on module includes an electrical connection configured to enable the add-on module to be electrically connected to the electronics of the field device.

9. The system of claim 8, wherein the add-on module is configured to receive power from the field device via the electrical connection.

10. The system of claim 8, wherein:
- the evaluation unit is configured to determine the instantaneous stress and/or the total stress further based on at least one process variable transmitted via the electrical connection to the evaluation unit and acquired by measurement by the field device; and
- the at least one process variable includes the at least one measurement variable and/or at least one auxiliary variable acquired by measurement via the measuring device or by a sensor disposed in the portion of the field device adjacent the process.

11. The system of claim 10, wherein the evaluation unit is configured to assign a process stress value to an instantaneous value of the at least one process variable based on characteristic data or characteristic curves stored in the memory and to determine the instantaneous stress as a function, as the sum or weighted sum of the process stress value and the ambient stress values.

12. The system of claim 1, wherein the field device comprises electronics disposed in the portion of the field device opposite the process and connected to the measuring device,
- wherein the field device is configured to acquire by measurement at least one process variable and to provide the at least one process variable via an interface connected to the electronics or an interface configured to connect an operating unit and/or a display connected to the electronics,
- wherein the evaluation unit is configured to determine the instantaneous stress and/or the total stress further based on the at least one process variable,
- wherein the at least one process variable includes the at least one measurement variable and/or at least one auxiliary variable acquired by measurement via the measuring device or by a sensor disposed in the portion of the field device adjacent the process, and
- wherein the add-on module is connected to the electronics via the interface.

* * * * *